(12) United States Patent
Leary et al.

(10) Patent No.: US 8,474,408 B2
(45) Date of Patent: *Jul. 2, 2013

(54) PORTABLE DEVICE FOR CLEANING AN ANIMAL'S PAW AND ASSEMBLY METHOD THEREOF

(75) Inventors: Brianne B. Leary, New York, NY (US); Andrew Taylor, Farmington, CT (US)

(73) Assignee: Pet Product Innovations, LLC, Des Plaines, IL (US)

( * ) Notice: Subject to any disclaimer, the term of this patent is extended or adjusted under 35 U.S.C. 154(b) by 1233 days.

This patent is subject to a terminal disclaimer.

(21) Appl. No.: 11/816,922

(22) PCT Filed: Feb. 23, 2006

(86) PCT No.: PCT/US2006/006218
§ 371 (c)(1),
(2), (4) Date: May 1, 2008

(87) PCT Pub. No.: WO2006/091643
PCT Pub. Date: Aug. 31, 2006

(65) Prior Publication Data
US 2009/0050071 A1    Feb. 26, 2009

Related U.S. Application Data

(60) Provisional application No. 60/654,933, filed on Feb. 23, 2005.

(51) Int. Cl.
*A01K 13/00*    (2006.01)
*A01K 29/00*    (2006.01)

(52) U.S. Cl.
USPC ............ 119/600; 119/601; 119/650; 119/673

(58) Field of Classification Search
USPC ................. 119/673, 675, 652, 664, 651, 600, 119/601, 650; 15/104.92, 220.4, 114, 160, 15/21.2, 161; 601/166; 603/310; 4/622
See application file for complete search history.

(56) References Cited

U.S. PATENT DOCUMENTS

| | | |
|---|---|---|
| 110,959 A | 1/1871 | Darling |
| 426,342 A | 4/1890 | Wallace, Jr. et al. |
| 1,320,633 A | 11/1919 | Minkler |
| 1,758,011 A | 5/1930 | Reach |
| 2,603,858 A | 7/1955 | Roy et al. |
| 2,744,276 A | 5/1956 | Chambless |
| 3,004,089 A | 10/1961 | Boynton |
| 3,044,089 A | 7/1962 | Boynton |
| 3,133,305 A | 5/1964 | Revan-Rosenstock |
| 3,221,355 A | 12/1965 | Grommes |
| 3,224,029 A | 12/1965 | Domingos |
| 3,271,802 A | 9/1966 | Thompson |
| 3,281,881 A | 11/1966 | Yetter |

(Continued)

FOREIGN PATENT DOCUMENTS

| | | |
|---|---|---|
| CA | 2 282 854 A1 | 3/2001 |
| WO | 03/092366 | 11/2003 |

*Primary Examiner* — Monica Williams
(74) *Attorney, Agent, or Firm* — Cahn & Samuels, LLP (57) ABSTRACT

A device for cleaning an animal's paw including a container (10) adapted to retain a cleaning agent, the container defining an opening and including a side wall, a cleaning platform (50) disposed in said container and defining a space (60) between said cleaning platform and said container side wall, and a squeegee member (85) substantially covering said opening.

15 Claims, 8 Drawing Sheets

U.S. PATENT DOCUMENTS

| | | | |
|---|---|---|---|
| 3,316,922 A | 5/1967 | Seidler | |
| 3,432,108 A * | 3/1969 | Enright | 241/46.016 |
| 4,282,891 A | 8/1981 | Duceppe | |
| 4,317,431 A | 3/1982 | Sparkes | |
| 4,321,936 A * | 3/1982 | Chaconas | 132/75 |
| 4,380,839 A | 4/1983 | Caradonna | |
| 4,439,884 A | 4/1984 | Giorni | |
| 4,474,195 A * | 10/1984 | Warner | 132/73 |
| 4,530,726 A | 7/1985 | Montiel | |
| 4,554,696 A | 11/1985 | Nye, Jr. | |
| 4,630,744 A | 12/1986 | Trombly | |
| 4,644,966 A * | 2/1987 | Ferrari | 132/73 |
| 4,734,952 A | 4/1988 | Parchment et al. | |
| 4,750,230 A | 6/1988 | Osborn | |
| 4,764,563 A | 8/1988 | Meredith et al. | |
| 4,821,358 A | 4/1989 | Wyckoff et al. | |
| 4,897,892 A | 2/1990 | Bubien | |
| 4,946,510 A | 8/1990 | Kinnebrew, II et al. | |
| 5,054,503 A | 10/1991 | Keller | |
| 5,056,691 A * | 10/1991 | Tolbert | 222/466 |
| 5,269,615 A | 12/1993 | Lewis, Jr. | |
| 5,298,077 A | 3/1994 | Saarela et al. | |
| 5,404,610 A | 4/1995 | Coyer, Sr. et al. | |
| 5,471,706 A | 12/1995 | Wallock et al. | |
| 5,613,506 A * | 3/1997 | Kurokawa | 132/73 |
| 5,664,277 A | 9/1997 | Matlock | |
| 5,666,684 A | 9/1997 | Cussen | |
| 5,732,435 A | 3/1998 | Williams et al. | |
| 5,774,909 A | 7/1998 | Stable | |
| 5,794,301 A | 8/1998 | Hietala | |
| 5,829,086 A | 11/1998 | Billek | |
| 5,855,212 A | 1/1999 | Walker | |
| 6,065,431 A | 5/2000 | Davis | |
| 6,086,275 A | 7/2000 | King | |
| D431,624 S | 10/2000 | Colonello | |
| 6,269,512 B1 | 8/2001 | Thomson et al. | |
| 6,314,965 B1 * | 11/2001 | Walker | 132/74.5 |
| 6,343,612 B1 | 2/2002 | Dahl | |
| 6,439,160 B1 | 8/2002 | Wheelwright | |
| 6,634,367 B2 | 10/2003 | Abraham et al. | |
| 6,708,363 B2 | 3/2004 | Larsen | |
| 6,745,721 B1 | 6/2004 | Hammer | |
| 6,813,798 B2 | 11/2004 | Moga | |
| 6,851,391 B1 | 2/2005 | Mulich et al. | |
| 6,893,612 B2 | 5/2005 | Kacian et al. | |
| 6,901,935 B2 * | 6/2005 | Chang | 132/75 |
| 2002/0039513 A1 | 4/2002 | Pink | |
| 2002/0069472 A1 | 6/2002 | Glass | |
| 2002/0152568 A1 | 10/2002 | Dillinger | |
| 2005/0211270 A1 | 9/2005 | Wheelwright | |
| 2005/0224013 A1 | 10/2005 | Bestelmeyer | |

\* cited by examiner

PORTABLE DEVICE FOR CLEANING AN ANIMAL'S PAW AND ASSEMBLY METHOD THEREOF

This application is a 371 national stage application of international application PCT/US2006/006218 filed on Feb. 23, 2006 and claims priority to U.S. patent application Ser. No. 60/654,933 filed on Feb. 23, 2005.

I. FIELD OF THE INVENTION

This invention relates to improvements to traditional devices for cleaning an animal's paws and assembly methods thereof.

II. BACKGROUND OF THE INVENTION

The company and companionship of a pet such as a dog is invaluable. Human nature has a great need to have such pets close at hand and to allow them into our homes. However, such pets, particularly dogs, are notorious for tracking dirt inside the home and getting paw prints onto floors, carpeting, and furniture. Unfortunately, the soiling of a dog's paws is, for the most part, unavoidable given the necessity of allowing a dog outside for exercise and excreting bodily waste and, in some instances, the instinct in many breeds to thereafter scrape the earth as if to cover the waste with dirt. Inclement weather only exacerbates this problem.

Traditionally, pet owners have had to either bath their dogs or wash their paws by traditional means, for example with a wet towel or by placing the entire dog into a bathtub. Both are messy and involved processes. Bathing results in washing more dog than is dirty, and the wet towel process requires restricting movement of the dog (sometimes a monumental task in an of itself while fetching and preparing the towel, carrying a dripping towel across the floor, and returning a wet and soiled towel to a wash basin thereafter.

In the past, devices have been used to wash only an animal's paws. Some such devices are adapted to fit over the paw, but are usually cumbersome, inefficient, and fail to adequately solve the above-mentioned problems. For example, some devices are sized to fit the animal's paw, requiring a person with pets of different sizes to purchase and store numerous devices. Some devices are not large enough to hold sufficient amounts of water, thereby requiring several trips to the tap to empty and refill the device. Some devices do not, by design, prevent tipping over, nor are they designed to allow adequate water to come into contact with the paw during the wash. Other devices also do not prevent splashing of the water (or other cleaning agent) when washing the paw or withdrawing it from the device. The problem of splashing is particularly keen given the unpredictable behavior of animals and the need to hold the device at an angle while cleaning the paw. A further issue not solved by other devices is removing the scrubbing element therein for cleaning or replacement in an easy way.

Notwithstanding the usefulness of the structures previously used for cleaning an animal's paws, a need still exists for a device providing a convenient and efficient one-size-fits-all means to clean the paw in a convenient, inexpensive way, to prevent tipping over, to hold sufficient water and allow it to adequately come into contact with the paw during the wash, to prevent splashing, and to easily remove the scrubbing element.

III. SUMMARY OF THE INVENTION

It is an object of at least one embodiment of the invention to overcome the foregoing exemplary shortcomings and problems.

It is another object of at least one embodiment of the invention to provide a portable device constructed of durable materials for cleaning an animal's paws.

It is a further object of at least one embodiment of the invention to allow the cleaning of different sized paws in one device.

It is also an object of at least one embodiment of the device to store a sufficient amount of the cleaning agent and to provide adequate contact between the cleaning agent and the paw.

It is still a further object of at least one embodiment of the invention to provide a means to minimize splashing while traveling to and from a water source, during wash, and when the paw is removed from the device.

Another object of at least one embodiment of the invention is to provide an easy way to remove the scrubbing element for cleaning or replacement.

Yet another object of at least one embodiment of the invention is to avoid tipping over.

In one embodiment of the invention a device for cleaning an animal's paw includes a container adapted to retain a cleaning agent, a cleaning platform within the container, and a squeegee member substantially covering the opening of the container. The cleaning platform defines a space between the cleaning platform and the container side wall. In another embodiment at least one scrubbing element is attached to the interior surface of the cleaning platform. In yet another embodiment, the cleaning platform includes a plurality of holes, and at least one scrubbing element is attached to at least one of the holes. In a further embodiment, the device includes a lid adapted to cover and seal the container opening. In yet another embodiment, the container includes a handle.

Still another embodiment of the invention defines a method for assembling the device for cleaning an animal's paws. The method includes the step of attaching the cleaning platform to the container. In another embodiment, the method includes attaching the squeegee member to the container. In yet another embodiment, the process includes attaching a lid to the container. In a further embodiment, the process includes attaching at least one scrubbing element to the interior surface of the cleaning platform.

In the following enabling description, reference is made to the accompanying drawings which are shown by way of illustration of the specific embodiments in which the invention may be practiced. In the following embodiments the apparatus and methods should become evident to a person of ordinary skill in the art and in sufficient detail to enable those skilled in the art to practice the invention. It is to be understood that other embodiments may be used and that structural changes based on presently known structural and/or functional equivalents may be made without departing from the scope of the invention.

V. DETAILED DESCRIPTION OF THE INVENTION

As used herein, "substantially," "generally," "relatively" and other words of degree are relative modifiers intended to indicate permissible variation from the characteristic so modified. They are not intended to be limited to the absolute value or characteristic which they modify, but rather possessing more of the physical or functional characteristic than its opposite, and preferably approaching or approximating such a physical or functional characteristic.

As used herein, the phrase "squeegee member" refers to a device made of a flexible material such as rubber, leather, or brushes, at least substantially covering the opening of the container and adapted to receive the paw, to minimize leaking and splashing of the cleaning agent, and to flexibly drag along the surface of the paw as the paw is withdrawn from the container to remove cleaning agent and dirt.

As used herein, the phrase "scrubbing element" refers to an apparatus constructed of materials suitable for scrubbing an animal paw to dislodge dirt and otherwise clean the paw, such structures including brushes, sponges, flexible combs and other abrasives.

The present invention is generally directed to devices for cleaning the paws of an animal, such as a pet dog, and methods for assembling the same. A paw cleaning device in accordance with one embodiment of the invention, illustrated in FIGS. 1, 2 and 3, comprises a container 10 adapted to hold a cleaning agent 20 and a cleaning platform 50 inside the container 10. In some embodiments, the platform 50 includes a scrubbing element 120 on which the animal's paw is cleaned (see FIG. 5). The platform 50 is appropriately sized such that a space 60 is formed between the platform 50 and the side wall of the container 10. This space 60 promotes circulation of the cleaning agent 20. A squeegee member 80 (FIGS. 6 and 7) substantially covers the opening 30 of the container 10 and helps remove dirt and water (or other cleaning agent 20) when the paw is withdrawn from the container 10. The embodiment illustrated in FIG. 1 also has a lid 150 sealing the opening 30 of the container 10 and a handle 140.

Consistent with the invention, the container 10 can be of any shape or size sufficient to provide a reservoir for the cleaning agent 20 and room for the platform 50. The cleaning agent 20 can be any material, preferably liquid or powder, suitable for cleaning an animal's paws, including water, soaps, disinfectants, and deodorants. As will be recognized by skilled artisans, cleaning agent 20 may be replaced by other substances if desired.

The cleaning platform 50 is located inside the container 10. The platform 50 is sized to form a space 60 between the platform 50 and the side wall 40 of the container 10. Water (or other cleaning agent 20) passes within this space 60, the space 60 promoting circulation of the cleaning agent 20. The platform 50 can be of any number of shapes and sizes. It can be hollow, tubular, or consisting of a single or plurality of flat surfaces. It can be opened or closed at the lower end 170 of the platform. In the embodiment illustrated in FIG. 4, the lower end 170 of the platform 50 is open, thereby further promoting circulation of the cleaning agent 20 and providing a way for dirt and grime to fall away from the cleaning area and settle to the bottom 180 of the container 10. The platform 50 can be constructed of porous material or include a number of holes 130 (see FIGS. 2, 3, 5, 10, 11) which also promote circulation of the cleaning agent 20. Further, the platform 50 can also be made of abrasive material to scrub the paw.

Figure 11:
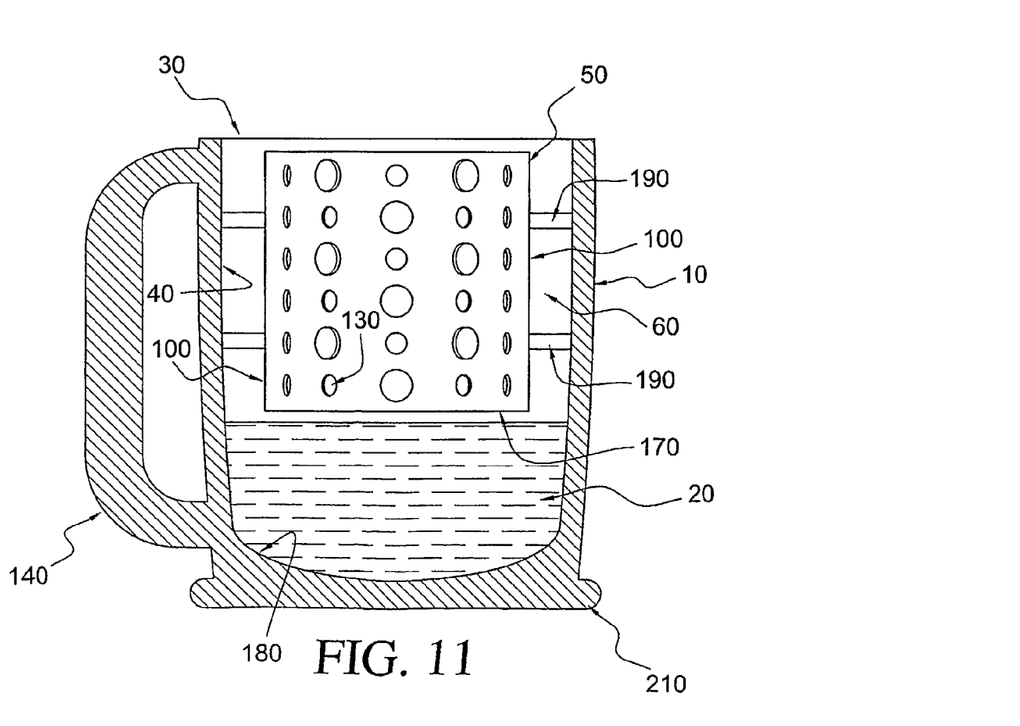
FIG. 11 is a cutaway view of an embodiment of the invention with the cleaning platform attached to the container side wall by posts.

The platform 50 can be attached to the container 10 either fixedly or removably. For example, in the embodiments illustrated in FIGS. 2, 3, 4, and 5, the removable platform 50 has a collar 160 which rests upon and engages the upper lip 90 of the side wall 40 of the container 10. The platform 50 can also be attached to the bottom 180 of the container 10 (FIG. 10) or connected to the side wall 40 of the container 10, for example by way of posts 190 (FIG. 11).

Figure 8:
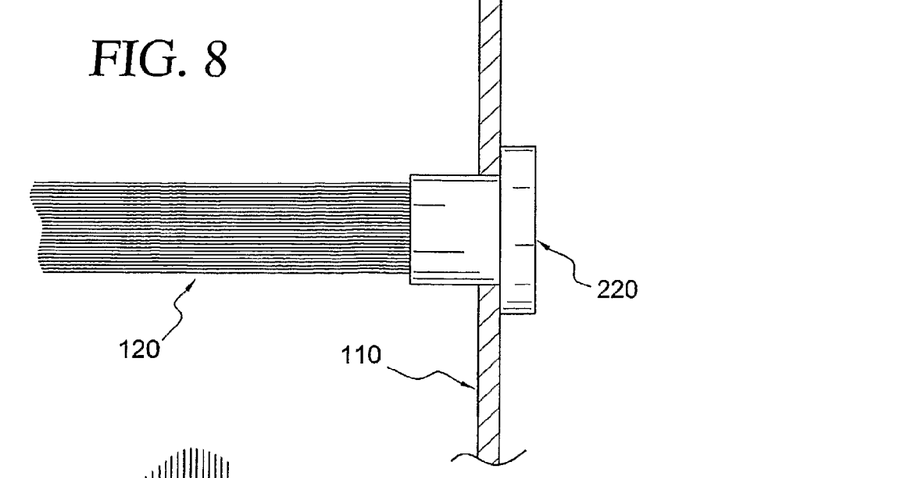
FIG. 8 is an assembled side view of a brush-shaped embodiment of a scrubbing element attached to the cleaning platform.
Figure 9:
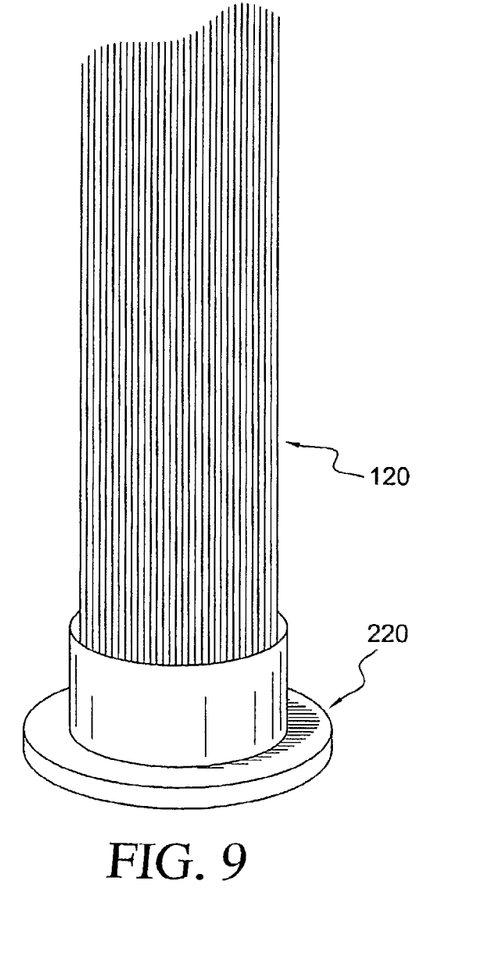
FIG. 9 depicts the scrubbing element embodiment illustrated in FIG. 8.
Figure 10:
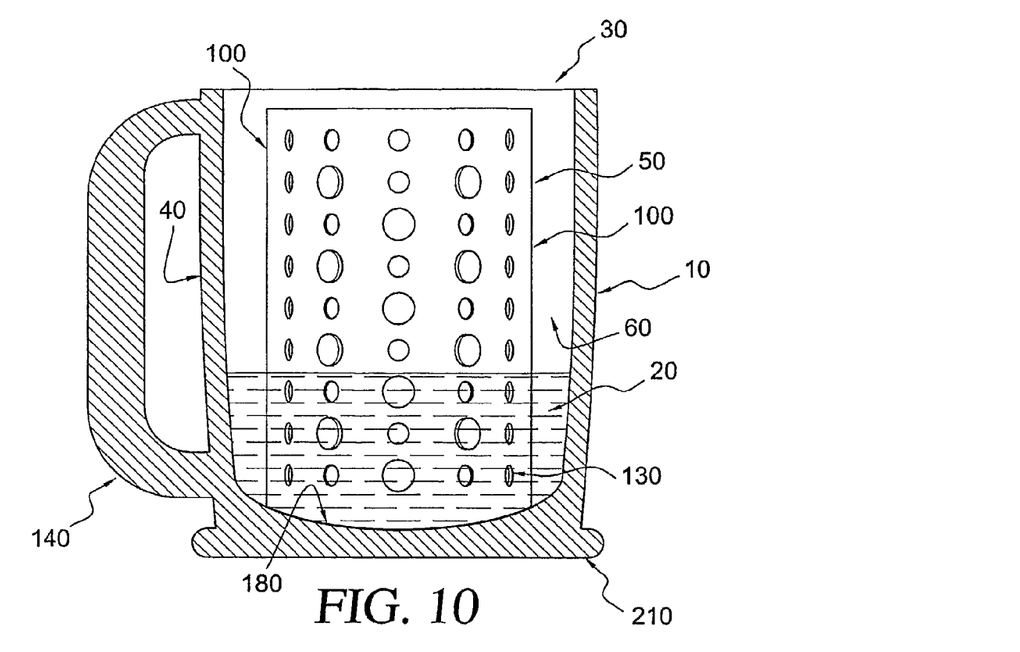
FIG. 10 is a cutaway view of an embodiment of the invention with the cleaning platform attached to the bottom of the container.

To facilitate scrubbing of the paw, the cleaning platform 50 can include scrubbing elements 120. Scrubbing elements 120 comprise structures suitable for cleaning or scrubbing the animal's paw, such as sponges, flexible combs and other abrasives. In the embodiment illustrated in FIG. 9 the scrubbing element 120 is a brush. In certain embodiments, scrubbing elements 120 are attached to the interior surface 110 of the cleaning platform 50. In the embodiment illustrated in FIG. 5, several brush-shaped scrubbing elements 120 are attached to some of the holes 130 in the platform 50. FIG. 8 illustrates a brush-shaped scrubbing element 120 with a foot 220 sized larger than the hole 130 in the platform 50 with all but the foot 220 passing through the hole 130. Scrubbing elements 130 can be fixedly or pivotally attached to the platform 50 (for example, by adhesive, plastic melting, snap-fit, screwing, hinge or otherwise). The scrubbing element 120 can also be removable.

In certain embodiments, the animal's paw can be scrubbed by either the platform 50 or the scrubbing elements 120. The container 10, therefore, does not have to come into contact with the paw, and can be sized narrow or wide. A wider container 10 with a wider base 210 is less likely to tip over.

Figure 5:
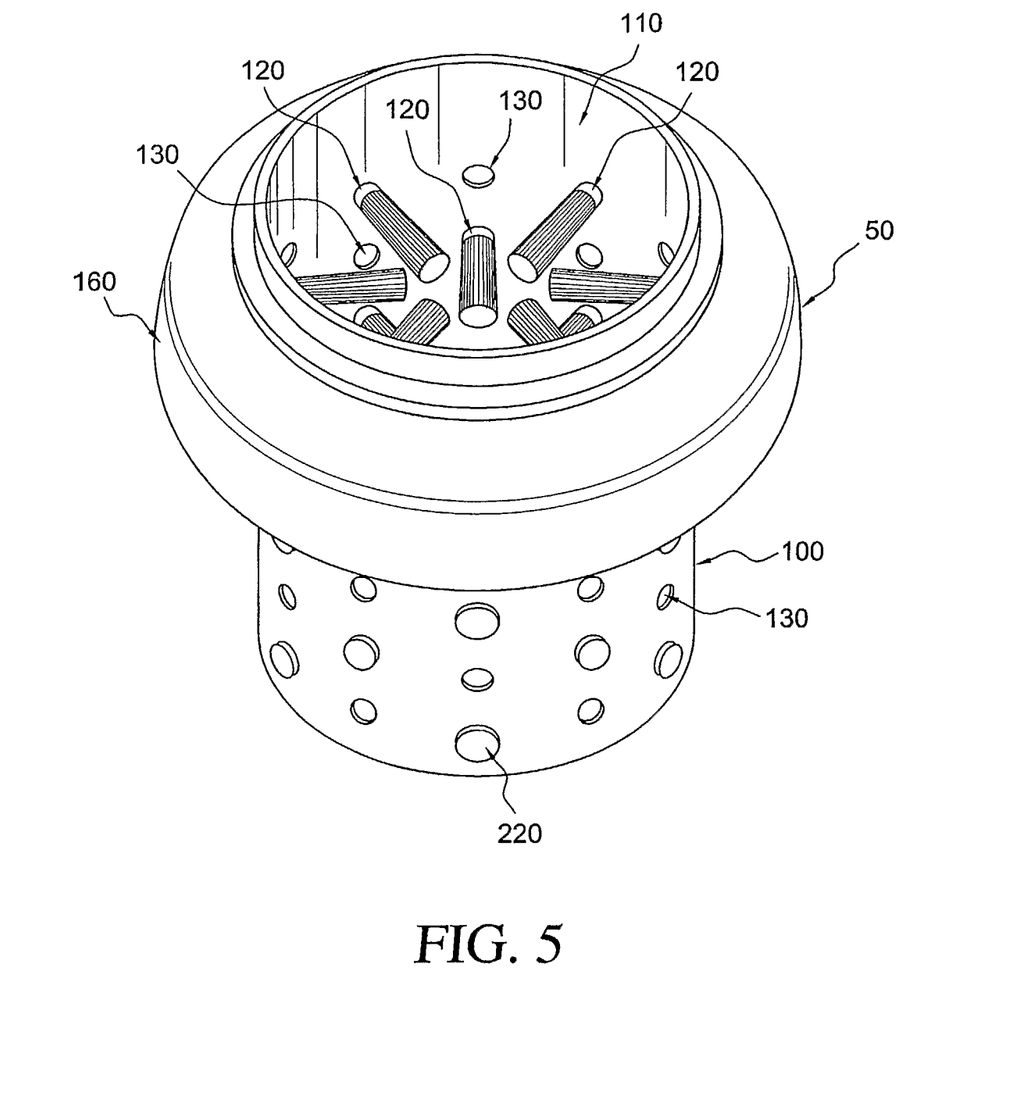
FIG. 5 is a top perspective view of an embodiment of the cleaning platform.

In certain embodiments, the scrubbing elements 120 surround the paw, as illustrated in FIG. 5. The scrubbing elements 120 can be flexible (brushes, for example), thereby accommodating paws of different sizes. Thus, the same platform 50 and scrubbing elements 120 can be used to clean both large paws and small paws in a "one-size fits all" manner. A scrubbing element 120 comprising a flexible sponge might accomplish this as well. Alternatively, cleaning platforms 50 can be constructed at different sizes to be interchangeable with the same container 10. By switching the platform 50, the same container 10 can be used to clean a variety of paw sizes. Alternatively, the scrubbing elements 120 can be interchangeable to fit different paw sizes, allowing use of the same container 10 and platform 50.

Figure 6:
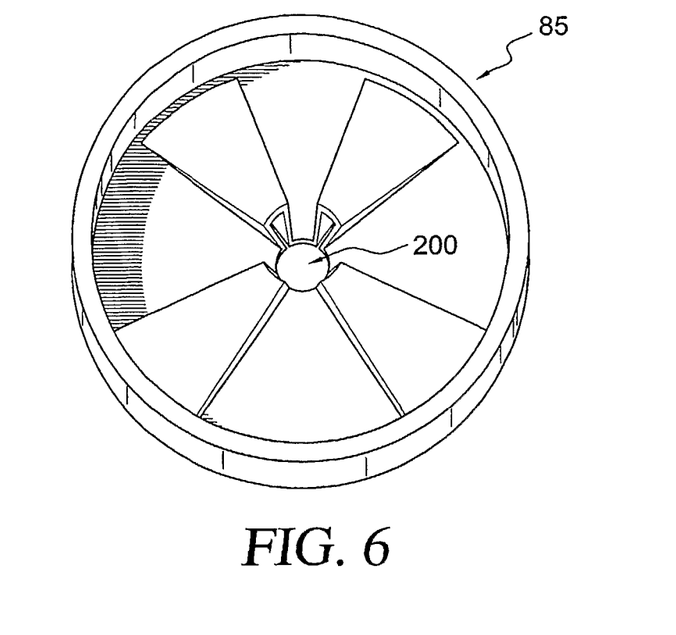
FIG. 6 is a top view of an embodiment of the flexible portion of a squeegee member.
Figure 7:
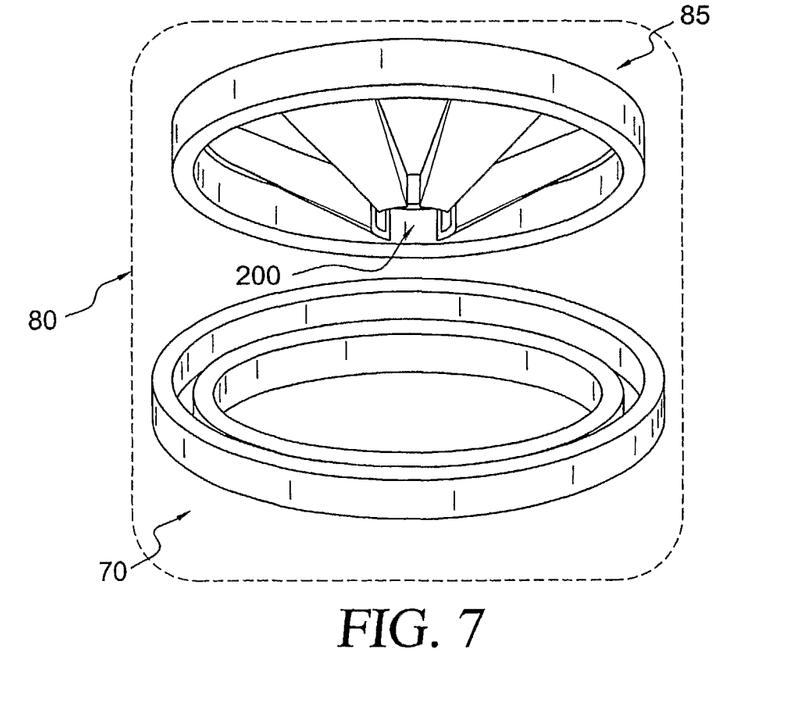
FIG. 7 is an exploded view of an embodiment of the squeegee member illustrating a bottom perspective view of the flexible portion depicted in FIG. 6 and a top perspective view of the girdle.

After the paw is cleaned, it is withdrawn from the container 10 through a squeegee member 80 which substantially covers the opening 30 of the container 10. The squeegee member 80 is constructed of a flexible material such as rubber, leather, or brushes, and flexibly drags along the surface of the paw to remove water (or other cleaning agents 20) and dirt. The squeegee member 80 also minimizes leaks and splashing of the cleaning agent 20. FIGS. 6 and 7 illustrate one embodiment of a squeegee member 80 constructed of soft rubber and formed with accordion-like folds, allowing the opening 200 in the squeegee member 80 to flexibly expand and contract. Flexibility of the squeegee member 80, accommodates paws of varying sizes.

Figure 3:
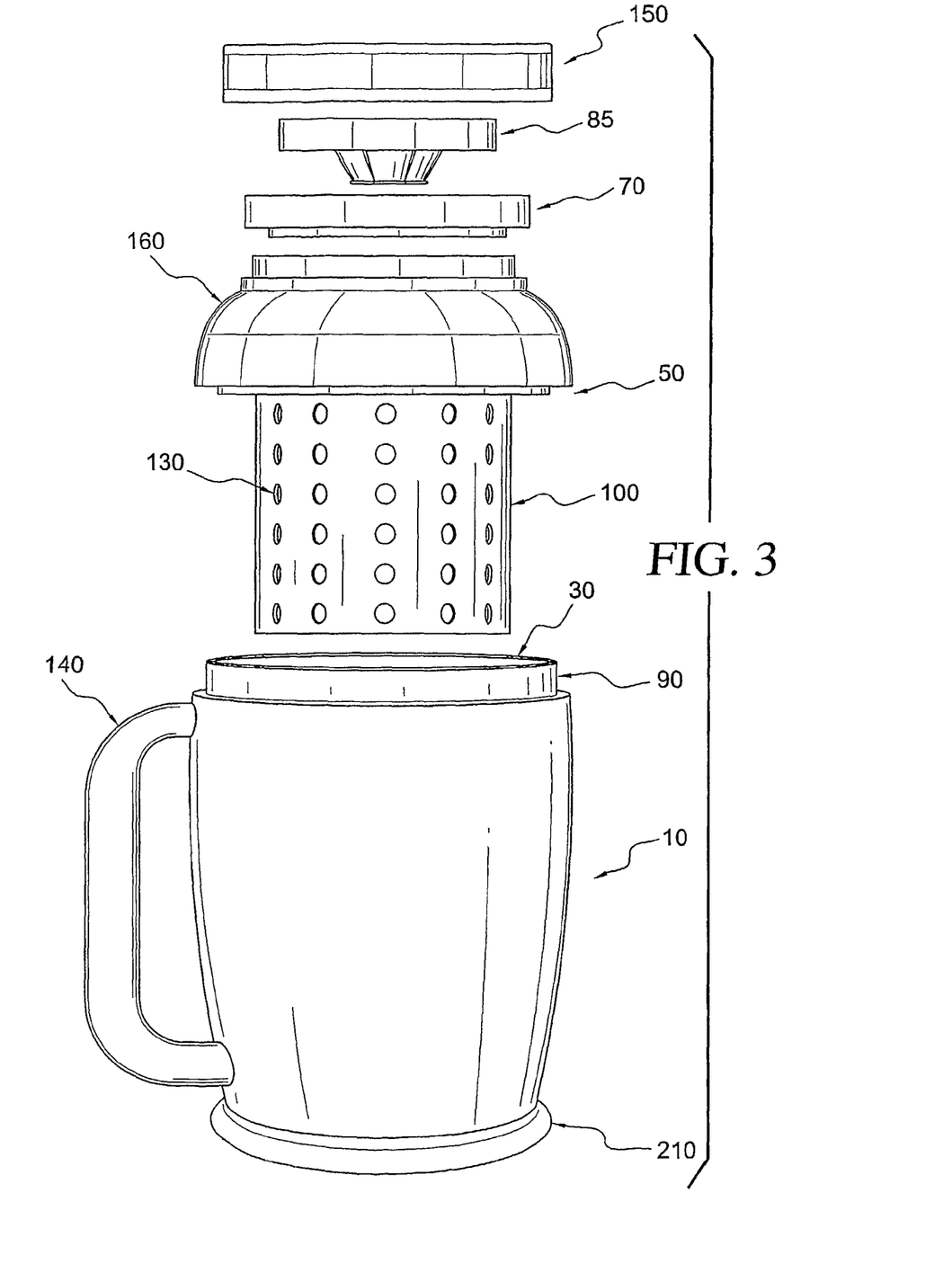
FIG. 3 is an exploded view of the embodiment illustrated in FIG. 1.
Figure 4:
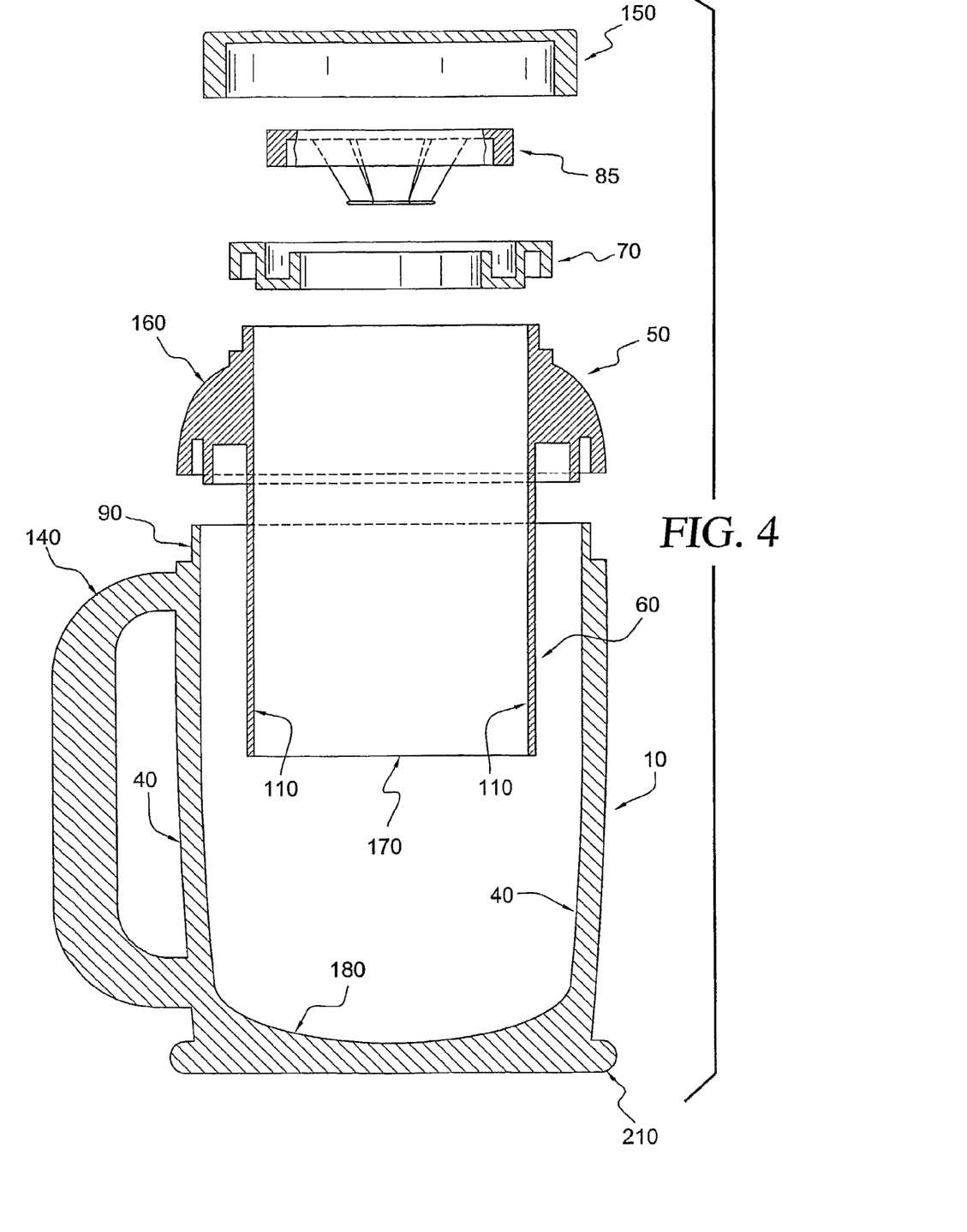
FIG. 4 is an exploded cutaway view of the embodiment illustrated in FIG. 1.

In the embodiments illustrated in FIGS. 3 and 4, the squeegee member 80 consists of a flexible portion 85 and a girdle 70. The flexible portion 85 fits into the girdle 70, and the girdle 70 is attached to the container 10, thereby allowing the flexible portion 85 to substantially cover the opening 30 of the container 10. In FIGS. 3 and 4, the girdle 70 is removably attached to the collar 160 of the platform 50, however the girdle 70 can also be fixedly attached to the collar 160. The squeegee member 80 or its girdle 70 can also be attached to the upper lip 90 of the side wall 40 of the container 10. In FIGS. 3, 4, and 7 the flexible portion 85 of the squeegee member 80 is removably attached to the girdle 70, however the flexible portion 85 can also be integrally formed with the girdle 70.

In several of the illustrated embodiments, the container includes a handle 140, thus making the paw cleaning device easier to carry and easier to use. Because of the squeegee member 80 substantially covers the opening 30 of the container 10, the device can be turned on an angle with minimized risk of splashing. The handle 140 also makes it easier to perform a back-and-forth scrubbing movement while cleaning the paw.

Figure 1:
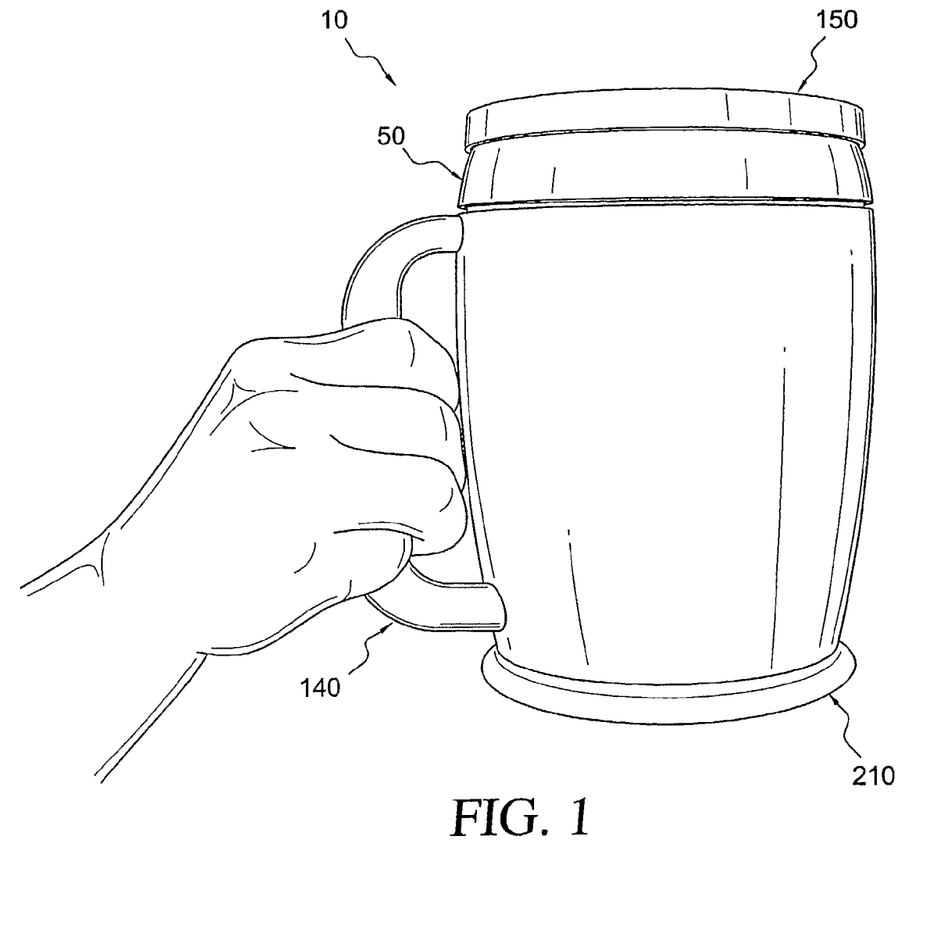
FIG. 1 is a side view of an embodiment of the invention.
Figure 2:
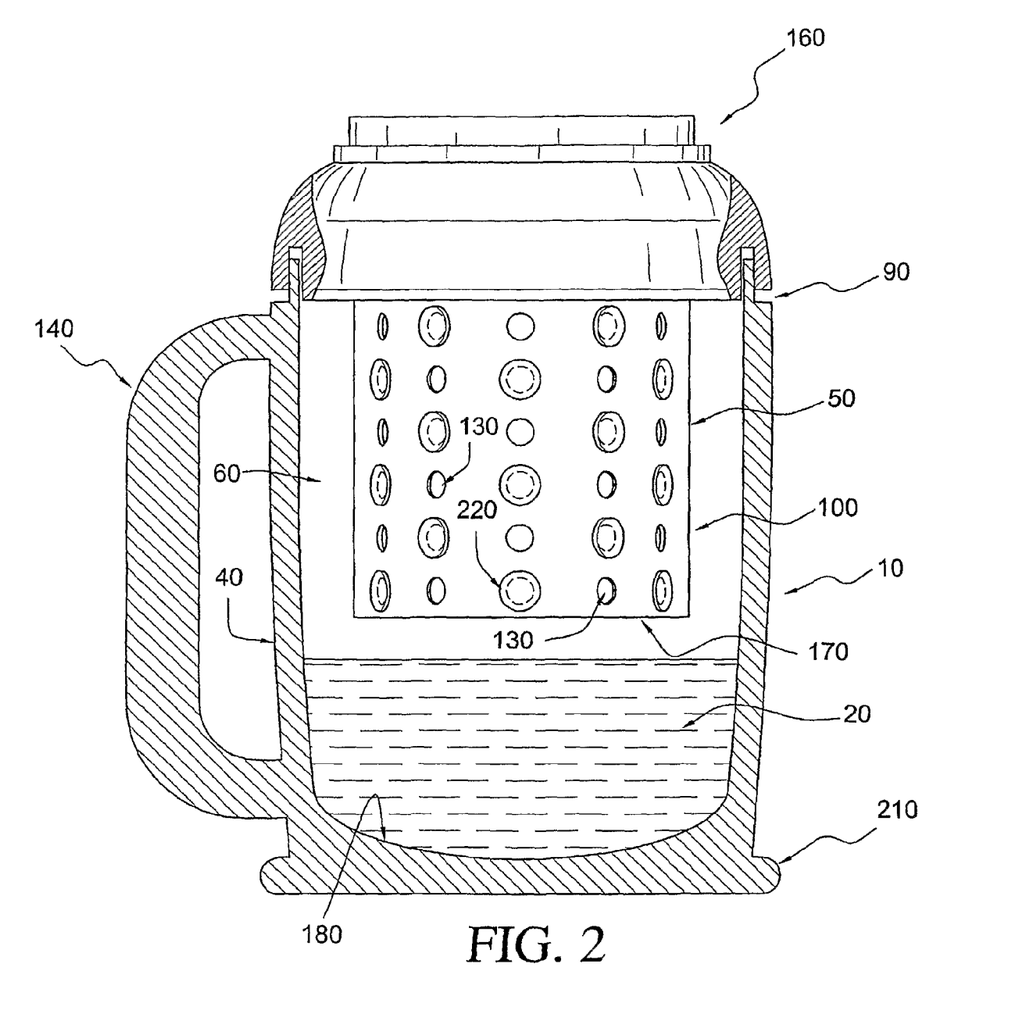
FIG. 2 is a cutaway view of the embodiment illustrated in FIG. 1 showing the container and cleaning platform.

In the embodiments illustrated in FIGS. 1, 3, and 4, the device also includes a lid 150, which fits over, covers, and seals the opening 30 in the container 10. The lid 150 prevents accidental spillage of the cleaning agent 20 during storage and transport and can also minimize unpleasant odors.

The invention also includes methods for assembling the paw cleaning device. According to an embodiment, the method comprises the step of attaching the cleaning platform 50 to the container 10. According to further embodiments, methods also include the steps of attaching the squeegee member 80 to the container 10 and attaching at least one scrubbing element 120 to the interior surface 110 of the platform 50. In certain embodiments, the step of attaching the squeegee member 80 to the container 10 includes attaching the squeegee 80 member to the cleaning platform 50 or, in another embodiment, attaching a flexible portion 85 of the squeegee member 80 to a girdle 70 and attaching the girdle 70 to the container 10.

Given the foregoing, it should be apparent that the specifically described embodiments are illustrative and not intended to be limiting. Furthermore, variations and modifications to the invention should now be apparent to a person having ordinary skill in the art. These variations and modifications are intended to fall within the scope and spirit of the invention as defined by the following claims.

The invention claimed is:

1. A device for cleaning an animal's paw, comprising:
a container adapted to retain a cleaning agent, said container defining an opening and including a side wall;
a cleaning platform disposed in said container and defining a space between said cleaning platform and the container side wall, said cleaning platform including a plurality of holes of substantially equal open area, wherein at least one scrubbing element engages at least one of the holes and at least one of the holes is open,
a squeegee member comprising a flexible material extending radially inward and substantially covering the opening of said container; and
a handle that has a first end and a second end attached to said container, the first end being vertically spaced from the second end.

2. The device as in claim 1 wherein said container side wall includes an upper lip surrounding said opening and said cleaning platform is attached to said upper lip.

3. The device as in claim 1 wherein said cleaning platform is attached to said container side wall.

4. The device as in claim 1 wherein said container defines a bottom interior surface and said cleaning platform is attached to said bottom interior surface of said container.

5. The device as in claim 1 wherein said squeegee member comprises:
a flexible portion substantially covering said opening of said container, and
a girdle attached to said flexible portion and attached to said container.

6. The device as in claim 1 wherein said cleaning platform comprises a rigid tube.

7. The device as in claim 1 wherein said cleaning platform includes an interior surface and at least one scrubbing element attached to said interior surface.

8. The device as in claim 7 wherein said at least one scrubbing element is fixedly attached to said cleaning platform.

9. A device as in claim 7, wherein the at least one scrubbing element comprises brushes, sponges, or flexible combs.

10. The device as in claim 1 wherein said cleaning platform is removable from said container.

11. The device as in claim 1 also comprising a lid adapted to cover and seal said opening of said container.

12. A device as in claim 1, wherein said squeegee member comprises accordion folds.

13. A device as in claim 1, wherein said cleaning platform comprises some holes that are open to promote the circulation of the cleaning agent and the at least one scrubbing element engages other holes.

14. A device for cleaning an animal's paw, comprising:
a container adapted to retain a cleaning agent, said container defining an opening and including a side wall;
a cleaning platform disposed in said container and defining a space between said cleaning platform and the container side wall, said cleaning platform including a plurality of holes of substantially equivalent geometric shape, wherein at least one scrubbing element engages at least one of the holes and at least one of the holes is open,
a squeegee member comprising a flexible member that substantially covers the opening of said container, the squeegee member including a plurality of accordion folds and a central aperture.

15. A device for cleaning an animal's paw, comprising:
a container adapted to retain a cleaning agent and to receive the animal's paw, said container defining an opening and including a side wall;
a cleaning platform disposed in said container and defining a space between said cleaning platform and the container side wall, said cleaning platform including a plurality of holes of substantially equal open area, wherein at least one scrubbing element engages at least one of the holes and at least one of the holes is open,
means for removing liquid and debris from the animal's paw by flexibly dragging along the paw; and
a handle that has a first end and a second end attached to said container, the first end being vertically spaced from the second end.

* * * * *